United States Patent [19]

Berginski

[11] 4,287,786
[45] Sep. 8, 1981

[54] STEERING COLUMN JACKET ON THE STEERING COLUMN OF MOTOR VEHICLES

[75] Inventor: Werner Berginski, Werdohl-Eveking, Fed. Rep. of Germany

[73] Assignee: Firma Leopold Kostal, Lüdenscheid, Fed. Rep. of Germany

[21] Appl. No.: 97,156

[22] Filed: Nov. 26, 1979

[30] Foreign Application Priority Data

Feb. 10, 1979 [DE] Fed. Rep. of Germany ....... 2905130

[51] Int. Cl.³ .............................................. B62D 1/16
[52] U.S. Cl. ...................................... 74/492; 70/256; 308/236
[58] Field of Search .................. 180/78; 280/779; 70/252; 74/492, 484 R; 200/61.27, 61.3, 61.31, 61.32, 61.34, 61.35, 61.38; 308/236

[56] References Cited

U.S. PATENT DOCUMENTS 3,791,182  2/1974  Oxley et al. .......................... 70/252

FOREIGN PATENT DOCUMENTS 2513050  1/1979  Fed. Rep. of Germany .
1296527  11/1972  United Kingdom .................. 74/492

Primary Examiner—John A. Pekar
Attorney, Agent, or Firm—Bacon & Thomas

[57] ABSTRACT

The invention relates to a steering column jacket of the steering column of motor vehicles which surrounds the steering spindle and contains a steering column assembly having a steering column switch or a switch rest. The steering wheel end of the steering column jacket forms a sleeve portion closed in the circumferential direction and receives a steering spindle bearing. From the front end of the steering column jacket a longitudinal rib extends, the flanks of which lead the steering column switch during the assembly, a window for the locking pin of the steering column lock being adjacent thereto.

2 Claims, 3 Drawing Figures

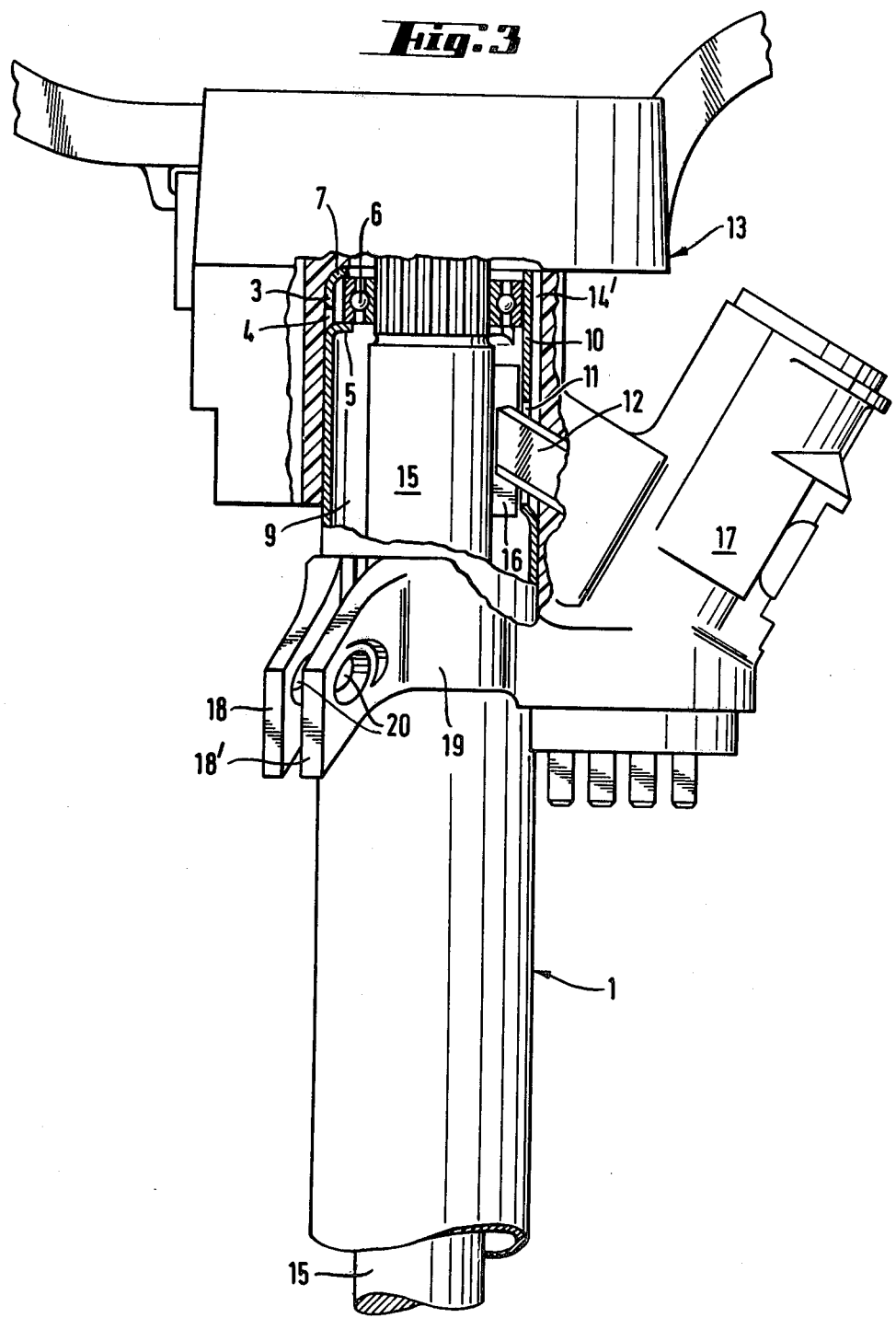

STEERING COLUMN JACKET ON THE STEERING COLUMN OF MOTOR VEHICLES

BACKGROUND OF THE INVENTION

The invention relates to a steering column jacket on the steering column of motor vehicles, the steering spindle extending through the interior space thereof and a steering column switch or switch rest containing an integrated steering column lock having a bearing sleeve, extending thereto, grasping around the steering wheel end thereof and being fastenable.

Prior art steering column jackets, upon which steering column switches are attachable, into which a steering lock is integrated and which comprise a sleeve-shaped projection, by which they encompass the steering column jacket, are provided with a recess on the side, directed to the steering wheel. Same serves for the position-true attaching of the switch and in order to be able to receive the locking pin itself or the guide flange thereof and, thus, to arrest the switch against torsion. In addition, there is welded to the outer circumference of the steering column jacket, in the axial direction, a web, at the two lateral faces of which there are located flanges of a mounting bracket, positioned on the switch housing, when the switch is put on. By means of a screw connection extending through specific holes of the bracket flanges the switch is tightened on the steering column jacket. The switch annularly surrounding the steering column jacket receives a steering spindle bearing on its side directed to the steering wheel which bearing encloses the steering spindle by its inner flange. With the ignition key removed and with corresponding steering wheel position the locking pin of the steering column lock is between two locking jaws fastened on the steering spindle; thereby a rotation of the steering wheel is prevented.

Prescriptions issued for reasons of safety against pilferage and theft demand that when the locking pin is moved out the force necessary to remove the safety must be, at least, 300 N m. This high force, in the case of the prior art steering column jacket type brings about a considerable expenditure to achieve sufficient switch stability. Therefore, the switch housings are manufactured of steel castings or die-cast zinc.

SUMMARY OF THE INVENTION

The present invention has for its object to achieve by means as simple as possible that the switches can be produced lighter—resulting in the saving in weight demanded by the automobile industry and may be made thus, of synthetic material more favourable in cost respect.

According to the invention this is achieved in that the steering wheel end of the steering column jacket forms a sleeve portion as a compact whole, in which a bearing of conventional type is received, which is supported, on the side away from the steering wheel, on, at least, three consoles displaced in regard to each other by 120°, arranged in one plane, projecting into the steering column jacket interior space and formed by free-cutting and bending and, on the side directed to the steering wheel, by folding the steering column jacket edge inwards at, at least opposed two opposite positions and that a longitudinal rib, of the width of the locking pin or its guide flange of the steering lock, integrated into the steering column switch, projects into the interior space of the steering column jacket, and, on the side away from the steering wheel, adjoins a window.

The self-contained annular sleeve section of the steering column jacket, on its side directed to the steering wheel, takes up all forces resulting from the turning moments in the case of extended locking pin, thereby cannot widen, as in the case of the provision of a slot, or cannot crack by notch effect at the slot corners. This fact in connection with the accommodation of the steering spindle bearing in the steering column jacket results in a relieving of the switch and particularly of the housing so that same can be manufactured of plastics. In the axial direction the bearing is position-secured by a three-point support on consoles and by partial bending or entire rolling up of the steering column jacket edge.

By the longitudinal rib projecting into the steering column jacket inner space, the longitudinal rib forming a receiving channel on the outer side of the steering column jacket, the position of the switch is predetermined in the assembly and is position-secured by the adjoining window, into which the locking pin itself or its guide flange engages.

A radial fixing of the steering spindle bearing is achieved by, at least, three bosses or projections, offset in regard to each other by 120° and projecting into the inner space of the steering column jacket. In this connection it is appropriate to keep the diameter of the circle circumscribed by the bosses a bit smaller than the outer diameter of the bearing.

BRIEF DESCRIPTION OF THE DRAWINGS

One embodiment of the invention will be described in more detail with reference to the drawing, wherein:

FIG. 3 is a partial section of the steering column jacket with the steering column switch mounted thereon.

DESCRIPTION OF A PREFERRED EMBODIMENT

Figure 1:
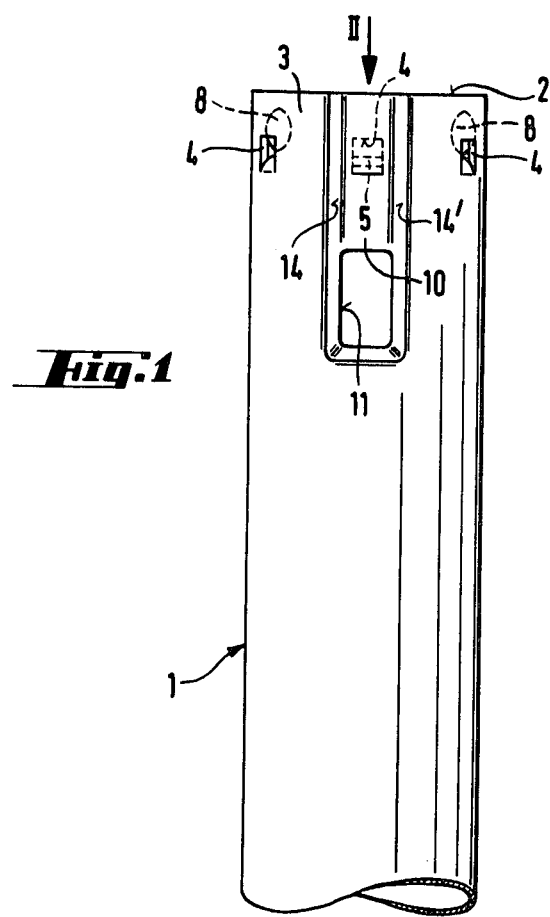
FIG. 1 is a partial section of a steering column jacket embodying the invention.
Figure 2:
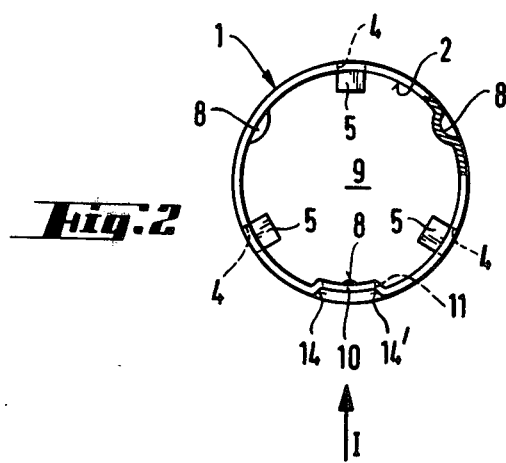
FIG. 2 is a top view of the steering column jacket.

The steering column jacket 1 comprises at its end 2, directed to the steering wheel (not shown), a sleeve portion 3, closed in the circumferential direction. Adjacent to this portion, there are provided three small windows 4 in the tube jacket, displaced in regard to one another by 120° each, which windows are formed by the cutting and bending of tabs and which form the consoles 5, situated in one plane. These consoles 5 support one face of a steering spindle bearing 6 which is held, at least, on two positions on the opposite side by the bending 7 of the steering column jacket edge. The radial fixing of the steering spindle bearing 6 is carried out by, at least, three bosses or projections 8 which are angularly displaced relative to each other by 120°. A longitudinal rib 10 extends from the upper front end 2 and projects into the steering column jacket inner space 9 and defines a receiving groove on the outer face of the sleeve portion 3. At the lower end of the longitudinal rib 10, there is provided a big window 11, in which the locking pin 12 or a guide flange thereof abuts on both sides. When mounting the steering column switch 13, the locking pin 12 or the guide flange thereof is introduced through the flanks 14, 14' of the longitudinal rib. Thereby the switch 13 is placed upon the steering column jacket 1 in a properly oriented manner.

A steering column switch 13 is mounted over the steering column jacket 1, which is shown in FIG. 3. There is also evident therein the steering spindle 15 projecting through the steering column jacket 1, with steering spindle bearing 6 and the seat thereof on the consoles 5 and the bending 7 of the steering column jacket edge. On the steering spindle 15 one of the two locking jaws 16 can be seen, between which the locking pin 12 of the steering lock 17, integrated into the steering column switch 13, is situated when in its extended condition, i.e., when the key is removed from the steering lock. Also the two flanges 18, 18' of the mounting clamp 19, extending from the steering column switch 13, can be seen, through holes 20 of which the switch 13 is tightened on the steering column jacket 1 by means of a screw connection (not shown).

I claim:

1. In a steering column assembly having a steering spindle and a jacket therearound with a steering column switch having a steering column lock pin for cooperation with the steering spindle, the improvement comprising:

at least three coplanar tabs struck inwardly from adjacent one end of said jacket and engaging one end face of a bearing for said steering spindle, said tabs being substantially equally angularly displaced from each other around said jacket;

said one end of said jacket being bent inwardly to engage the other end face of said bearing at at least two opposed positions and thereby hold said bearing in fixed axial position in said jacket; and an inwardly struck longitudinal rib on said jacket having an opening therein of a width at least equal to the width of said lock pin, said lock pin being projectable through said opening into engagement with said steering spindle.

2. A steering column assembly as defined in claim 1 including at least three equally spaced bosses extending inwardly from said sleeve and engaging the periphery of said bearing to radially center the same within said jacket.

* * * * *